United States Patent Office 3,266,551
Patented August 16, 1966

3,266,551
COMBUSTION CONTROL SYSTEM
Philip Giuffrida, North Andover, Mass., assignor to Electronics Corporation of America, Cambridge, Mass., a corporation of Massachusetts
Filed Aug. 31, 1965, Ser. No. 483,946
11 Claims. (Cl. 158—28)

This invention relates to combustion control systems and, more particularly, to improvements in control systems for supervising the ignition and continued existence of flame in the supervised combustion chamber after ignition.

It is an object of the invention to provide in a combustion supervision system an arrangement which enables an adequate purge cycle and precise timing of the ignition cycle with an inexpensive rotary timing device.

Another object of the invention is to provide novel and improved timing control for combustion supervision system.

A more specific object of the invention is to provide a combustion control which provides a purge cycle of substantial duration and short precise intervals for pilot proving and trial for ignition of main flame.

Still another object of the invention is to provide novel and improved safety features in a combustion supervision system.

In accordance with the invention, there is provided a combustion supervision system that includes a flame sensor, a device for controlling the flow of fuel into the supervised combustion chamber, a device for controlling the ignition of fuel flowing into the combustion chamber and a control for a blower that supplies air to the combustion chamber. The system includes a first timer, a circuit responsive to the first timer for energizing the blower, a second timer in the form of a rotary timing device, and a circuit responsive to the completion of the timing cycle of the first timer to energize the second timer. There are further provided circuits responsive to the rotary timer to operate the fuel control and the ignition control to initiate flame in the combustion chamber and to supervise the continued existence of flame after it has been established. A third timer provides a safety function and overrides all the other controls to de-energize the system automatically in response to malfunctions in the control system and the supervised combustion system. The first timer supervises a purge interval which precedes the ignition cycle while the rotary timer provides precise timing of the ignition (flame establishment) cycle. This rotary timer in the preferred embodiment includes a shaft in which is mounted a series of cams which in turn actuate electrical switches in sequence over a single complete rotation of the shaft. The rotary timer is selected so that a single complete rotation times the ignition cycle in coordination with other functions controlled by this rotary timer and establishes the precise timing intervals required by various safety codes and supervision requirements within the specified accuracy tolerances in a reliable manner utilizing an inexpensive drive motor and gearing such that the drive motor is not unduly loaded. The system is arranged so that a number of control functions are performed in sequence in a manner which provides comprehensive checking of the control system and supervision system and yet accomplishes comprehensive checking with inexpensive control circuit arrangements.

Further features of the control system include provision for auxiliary safety devices in an arrangement in which the auxiliary safety devices control that main control system energizing circuitry in the period prior to the ignition cycle and control the fuel flow independently of the main control system energizing circuitry after the ignition cycle has commenced.

Other objects, features and advantages of the invention will be seen as the following description of a particular embodiment thereof progresses, in conjunction with the drawings, in which.

Figure 1:
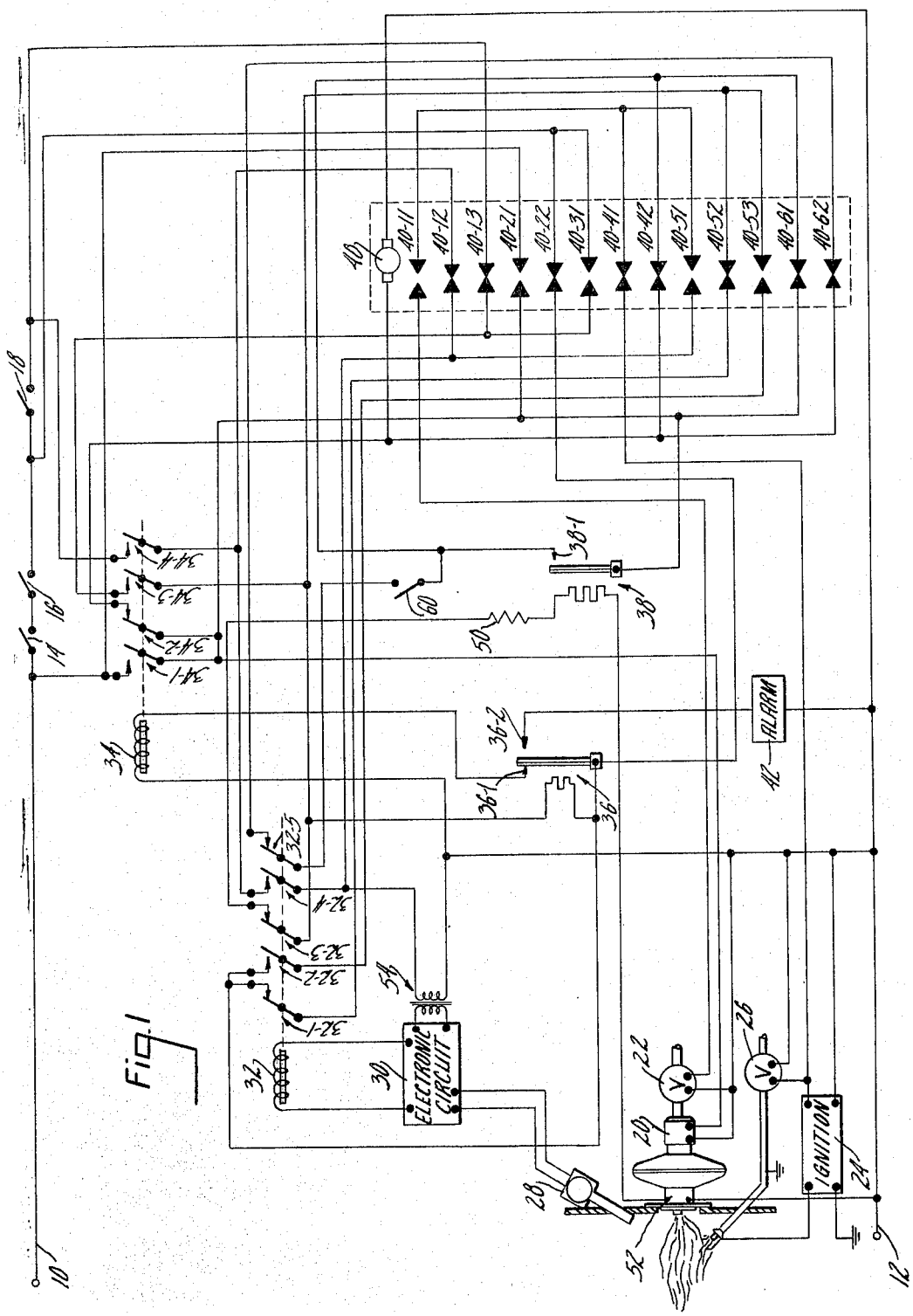
FIG. 1 is a schematic diagram of combustion supervision system constructed in accordance with the invention (FIG. 1a being a simplified diagrammatic arrangement of the system shown in FIG. 1)
Figure 1A:
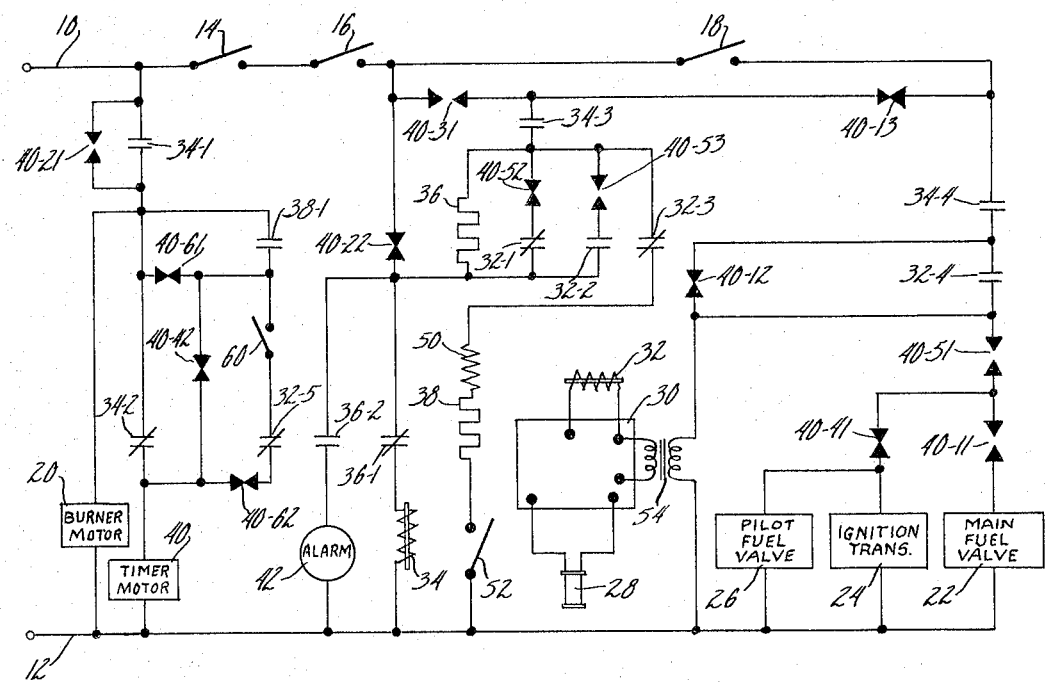

With reference to FIG. 1, the control system illustrated in schematic diagram form includes line terminals 10, 12 across which a suitable energizing signal is applied. Connected in series in line 10 is a limit control 14 and operating control 16 such as a thermostat and a system auxiliary condition sensing switch 18. The system includes a burner (blower) motor 20, a main fuel valve 22, ignition control that includes an ignition transformer 24 and a pilot fuel valve 26, a flame sensing element 28, such as a Geiger-Miller tube, a photocell or a flame rod, and electronic circuitry 30 coupled to the flame sensor 28 which provides an output to operate a flame relay 32 when the flame sensor 28 senses flame in the supervised combustion chamber. The system also includes a main control relay 34, a safety cutout timer element 36, a purge timer element 38, and a rotary timer comprising a motor 40 which rotates a series of cams mounted on a shaft driven by the timer motor. This timer motor is geared down so that it makes one complete revolution in thirty seconds. The sequence of opening and closing cam actuated circuits is indicated in FIG. 2.

Figure 2:
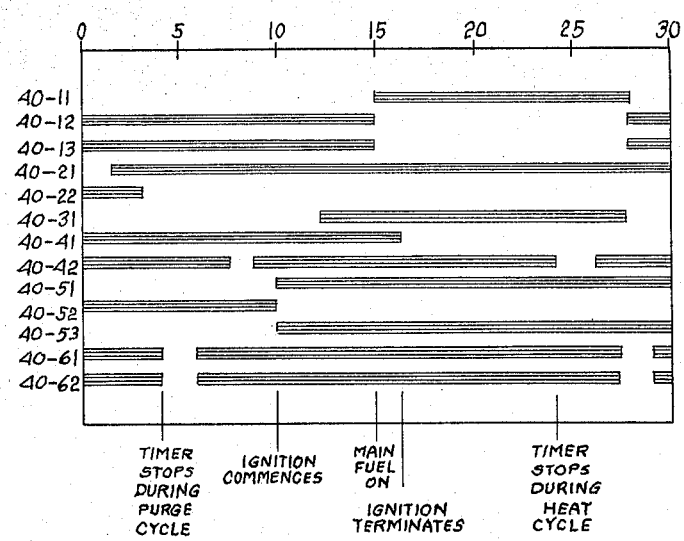
FIG. 2 is a timing diagram indicating the sequence of operation of the rotary timing device employed in the system shown in FIG. 1.

Prior to a call for system operation the switches are in the position indicated in FIG. 1 and FIG. 2 (time 0). Contacts controlled by flame relay 32 are designated 32-1, 32-2, etc.; contacts controlled by control relay 34 are designated 34-1, 34-2, etc.; contacts controlled by safety timer 36 are designated 36-1, 36-2, etc.; and contacts controlled by timer motor 40 are designated 40-11, 40-12, etc.

In operation, in response to a request for system operation by the closing of the limit control 14 and operating control 16, the control relay 34 is energized through the closed rotary timer controlled contacts 40-22 and the closed safety lock out switch contacts 36-1. Energization of control relay 34 closes contacts 34-1 to energize the blower motor 20. Simultaneously, contacts 34-2 open and prevent operation of rotary timer motor 40 through that path. However, there is provided an alternate timer motor energization path through timer contacts 40-61 and 40-42 so that the timer motor 40 runs for four seconds (until contacts 40-61 open). Further control relay contacts 34-3 close and complete a circuit through timer contacts 40-13, flame relay contacts 32-3 and resistor 50 to energize the purge timer element 38, provided there is air flow produced by the blower motor 20. This timer element is connected in series with an air flow interlock switch 52 which closes to complete a circuit only when air is flowing through burner passages. The closing of contacts 34-3 also completes a circuit through rotary timer contacts 40-52 and flame relay contacts 32-1 to maintain the control relay 34 energized so that opening of contacts 40-22 after the time motor 40 has rotated for three seconds does not interrupt energization of the control relay 34. It will be noted that the circuit for maintaining the control relay energized during this purge period is completed through a sense circuit including contacts 40-13 and an auxiliary equipment switch 18 such as an air flow switch or a low water cutout. Also, the contacts 34-4 are closed, completing a circuit through rotary timer contacts 40–12 to energize transformer 54 and the electronic circuitry 30 to render operative the flame sensor 28.

Three seconds after the system has started up rotary timer contacts 40–22 open to provide power failure protection so that the control relay 34 can only remain energized through its own contacts 34–3. It will be noted that should power fail for any reason during the purge operation, the system cannot be restarted until the timer has been reset. That resetting is accomplished through energization of the motor 40 after power is restored, via the closed control relay contacts 34–2 and the closed timer contacts 40–21, to complete one revolution of the timer shaft.

When the purge timer 38 has completed its heating cycle (a typical duration being one minute), its contacts 38–1 close to complete a circuit through rotary timer contacts 40–42 and re-energize timer motor 40 to commence the ignition cycle. The thermal timer contacts 38–1 are paralleled after two seconds of rotation of timer motor 40 by the closing of contacts 40–61.

The system disclosed optionally operates a damper to modulate the fuel air ratio during firing between a high firing condition in which the air damper is open, a low firing condition in which the damper is closed, and an automatic position in which the damper position is modulated in response to sensed firing conditions. At the start of the ignition cycle, the modulator system may be in the high fire condition and, therefore, at six seconds of rotation of timer motor 40, contacts (not shown) are actuated to move the modulator system damper from high fire condition to low fire condition. The timing motor 40 is energized through contacts 40–61 and 40–42 at this time, but contacts 40–42 open after 7.5 seconds of rotation and the timer motor 40 stops until an interlock circuit is established through a low fire interlock 60 and normally closed flame relay contacts 32–5. When the damper has reached the low fire position, contacts 60 close, and if there is no flame in the combustion chamber, the timer will be restarted through contacts 40–62. One second after motor 40 is restarted, contacts 40–42 reclose and the ignition cycle resumes.

Ignition commences at ten seconds of rotary timing with the closing of contacts 40–51. The ignition transformer 24 and the pilot valve 26 are first energized and then at fifteen seconds the main fuel valve 22 is energized (opened) by closing of contacts 40–11. At the same time, contacts 40–12 open and the electronic circuitry is de-energized unless flame relay 32 has been energized in response to the sensing of ignition flame in the supervised combustion chamber by flame sensor 28 and contacts 32–4 have been closed. At seventeen seconds the ignition circuitry is de-energized.

Also, at the start of the ignition cycle, at ten seconds, rotary timer contacts 40–52 open and contacts 40–53 close to modify the circuit that maintains the control relay 34 energized. Should a flame indicator have been generated prior to this time, either due to faulty action of the electronic circuitry 30 for example, or to actual flame in the combustion chamber, the energizing circuit for relay 34 will be maintained through the heater 36 which will time out in a safety cutout operation, while after the start of the ignition cycle the safety cutout heater 36 will be energized until the flame relay 32 is energized and will be reenergized should that relay drop out for any reason prior to the completion of the heat cycle. If this happens, the fuel is disconnected immediately by contacts 32–4. The timer will stop when contacts 40–42 open if not there already, and wait for lockout which will de-energize relay 34 through contacts 36–1 and, through contacts 36–2 will operate alarm 42. The electrical continuity of the safety cutout heater 36 is checked in the interval between ten seconds of timer rotation and detection of flame as the circuit for control relay 34 during that interval is completed only through heater 36. After flame is detected, a parallel circuit is completed through flame relay contacts 32–2 and the closed timer contacts 40–53 and heater 36 is operatively de-energized.

It will be noted that the flame relay contacts 32–4 are in the energizing circuit of the flame relay 32 so that should flame fail after it has been established, flame relay 32 will drop out within the allowed time delay and de-energize the electronic circuitry 30 as well as terminate the flow of fuel to the combustion chamber (via fuel valve 22).

Upon detection of flame, the timer motor 40 continues to run until contacts 40–42 open at twenty-four seconds. The timer motor then stops at that point and remains there until the control relay 34 drops out (typically in response to satisfaction of time condition which initiated the heating cycle via control 16) at which time contacts 34–2 close and re-energize the timer to run to the thirty second position at which time contacts 40–21 open de-energizing the timer motor circuit and placing the control system in stand by condition awaiting the next call for flame.

The sequence of operation of the contacts controlled by the rotary timing motor 40 is indicated in FIG. 2. It will be noted from that figure that the timing motor is started when heat request is initially made and then stopped during the purge cycle which is controlled by a separate and independent timer. After the completion of the purge cycle, the rotary timer is again started and after an interval which insures that the starting inertia of the timer has been overcome an ignition cycle is initiated. During this ignition cycle, the safety timer (a third timer) is checked for operability, auxiliary condition sensors which have been utilized to control the energization of the main control device are switched to control only the fuel flow to the combustion chamber, and ignition is initiated. A safety circuit is provided so that at the time the main fuel supply is turned on, flame must be established in the combustion chamber and further the pilot fuel supply and ignition devices are turned off in a very short time after the main fuel supply is turned on (in the described embodiment, an interval of only two seconds), all under the control of the rotary timer. Should the transfer from pilot flame to main flame not be completed within the allowed period (two seconds in the above-described embodiment) the combustion system is shut down in safe condition. Also, should flame fail for any reason after the ignition cycle has been completed, the system will be shut down. After the ignition cycle has been completed, the rotary timer is stopped until the demand for heat is satisfied and then the system is reset to stand by condition in readiness for the next call for heat.

While a particular embodiment of the invention has been shown and described, various modifications thereof will be obvious to those skilled in the art and, therefore, it is not intended that the invention be limited to the disclosed embodiment or to details thereof and departures may be made therefrom within the spirit and scope of the invention as defined in the claims.

What is claimed is:

1. Control apparatus for use with a combustion control system comprising a system control device, a flame sensor adapted to sense the presence of flame in a supervised combustion chamber, a device for controlling the flow of fuel into the supervised combustion chamber, a device for controlling the ignition of fuel flowing into the combustion chamber, a control for a blower that supplies air to said combustion chamber, a first timer, first circuit means responsive to energization of said system control device for energizing said blower control and said first timer, a second timer including an actuator and a plurality of timer contacts sequentially opened and closed in response to operator of said actuator, second circuit means responsive to the completion of the timing cycle of said first timer for energizing said timer actuator, third circuit means responsive to operation of said timer actuator to operate said fuel control and said ignition control to initiate flame in said combustion chamber and to energize said flame sensor to supervise the existence of flame in said combustion chamber, a third timer, and fourth circuit means responsive to said flame sensor for energizing said third timer, and fifth circuit means responsive to completion of the timing cycle of said third timer for energizing an alarm.

2. The control apparatus as claimed in claim 1 and further including switch means responsive to air flow produced by said blower connected in circuit with said first timer for enabling energization of said first timer only after the production of air flow by said blower.

3. The control apparatus as claimed in claim 2 and further including switch means responsive to said flame sensor connected in circuit with said first timer for enabling energization of said first timer only in the absence of detection of flame in the supervised combustion chamber by said flame sensor.

4. The apparatus as claimed in claim 3 and further including switch means responsive to an auxiliary condition in the supervised system, sixth circuit means responsive to said second timer for completing a circuit through said last named switch means to maintain said system control device energized prior to initiation of an ignition cycle, and seventh circuit means for connecting said last named switch means in series circuit with said fuel control device and independently of said system control device during the ignition and combustion portions of the combustion supervision cycle.

5. Control apparatus for use with a combustion control system comprising a system control device, a flame sensor adapted to sense the presence of flame in a supervised combustion chamber, a device for controlling the flow of fuel into the supervised combustion chamber, a device for controlling the ignition of fuel flowing into the combustion chamber, a control for a blower that supplies air to said combustion chamber, a first timer for sequentially initiating an ignition sequence and a combustion sequence in a combustion control cycle, first switch means responsive to a request for operation of said combustion control system for energizing said system control device, a second timer, circuit means responsive to energization of said system control device for energizing said blower control and said second timer, and means for preventing initiation of said ignition sequence by said first timer until completion of the timing cycle of said second timer.

6. The control apparatus as claimed in claim 5 and further including switch means responsive to air flow produced by said blower connected in circuit with said second timer for enabling energization of said second timer only after the production of air flow by said blower.

7. The control apparatus as claimed in claim 5 and further including switch means responsive to said flame sensor connected in circuit with said second timer for enabling energization of said second timer only in the absence of detection of flame in the supervised combustion chamber by said flame sensor.

8. Control apparatus for use with a combustion control system comprising a system control device, a flame sensor adapted to sense the presence of flame in a supervised combustion chamber, a device for controlling the flow of fuel into the supervised combustion chamber, a device for controlling the ignition of fuel flowing into the combustion chamber,
first switch means responsive to a request for operation of said combustion system for energizing said system control device,
a first timer for sequentially initiating an ignition sequence and a combustion sequence of the combustion supervision cycle,
first circuit means responsive to energization of said system control device for energizing said first timer,
second circuit means including second switch means responsive to an auxiliary condition in the supervised system for maintaining said system control device energized prior to energization of said ignition control device and initiation of said ignition sequence,
and third circuit means for connecting said second switch means in series circuit with said fuel control device independently of said system control device throughout said combustion sequence of said combustion supervision cycle.

9. The control apparatus as claimed in claim 8 and further including a control for a blower that supplies air to said combustion chamber, a second timer, fourth circuit means responsive to energization of said system control device for energizing said blower control and said second timer, and means for preventing initiation of said ignition sequence by said first timer until completion of the timing cycle of said second timer.

10. The control apparatus as claimed in claim 9 and further including switch means responsive to air flow produced by said blower connected in circuit with said second timer for enabling energization of said second timer only after the production of air flow by said blower.

11. The control apparatus as claimed in claim 10 and further including switch means responsive to said flame sensor connected in circuit with said second timer for enabling energization of said second timer only in the absence of detection of flame in the supervised combustion chamber by said flame sensor.

References Cited by the Examiner

UNITED STATES PATENTS

| | | | |
|---|---|---|---|
| 2,388,666 | 11/1945 | Bower | 158—28 |
| 2,748,845 | 6/1956 | Marshall et al. | 158—28 |
| 3,162,234 | 12/1964 | Hamelink | 158—28 |

JAMES W. WESTHAVER, *Primary Examiner.*